US008557952B2

(12) United States Patent
Marchionni et al.

(10) Patent No.: US 8,557,952 B2
(45) Date of Patent: Oct. 15, 2013

(54) POLYFUNCTIONAL (PER)FLUOROPOLYETHERS

(75) Inventors: Giuseppe Marchionni, Milan (IT); Silvia Petricci, Bresso (IT); Pier Antonio Guarda, Arese (IT)

(73) Assignee: Solvay Solexis S.p.A., Bollate MI (IT)

( * ) Notice: Subject to any disclaimer, the term of this patent is extended or adjusted under 35 U.S.C. 154(b) by 208 days.

(21) Appl. No.: 13/131,240

(22) PCT Filed: Dec. 2, 2009

(86) PCT No.: PCT/EP2009/066204
§ 371 (c)(1),
(2), (4) Date: May 25, 2011

(87) PCT Pub. No.: WO2010/063745
PCT Pub. Date: Jun. 10, 2010

(65) Prior Publication Data
US 2011/0230631 A1    Sep. 22, 2011

(30) Foreign Application Priority Data
Dec. 5, 2008 (EP) .................................... 08170813

(51) Int. Cl.
*C08G 75/00* (2006.01)
*C08G 73/00* (2006.01)

(52) U.S. Cl.
USPC ............ 528/391; 528/401; 522/180; 522/181

(58) Field of Classification Search
USPC ............. 522/180, 181; 528/391, 401; 558/46, 558/51, 54
See application file for complete search history.

(56) References Cited

U.S. PATENT DOCUMENTS

| | | |
|---|---|---|
| 3,442,942 A | 5/1969 | Sianesi et al. |
| 3,650,928 A | 3/1972 | Sianesi et al. |
| 3,665,041 A | 5/1972 | Sianesi et al. |
| 3,715,378 A | 2/1973 | Belardinelli et al. |
| 3,847,978 A | 11/1974 | Sianesi et al. |
| 4,235,804 A | 11/1980 | Krespan |
| 4,384,128 A | 5/1983 | Krespan |
| 4,451,646 A | 5/1984 | Sianesi et al. |
| 5,000,830 A | 3/1991 | Marchionni et al. |
| 5,144,092 A | 9/1992 | Marraccini et al. |
| 5,258,110 A | 11/1993 | Sianesi et al. |
| 5,719,259 A | 2/1998 | Tyul'ga |
| 5,744,651 A | 4/1998 | Marchionni et al. |
| 2010/0273968 A1 * | 10/2010 | Marchionni et al. .......... 526/247 |

FOREIGN PATENT DOCUMENTS

| | | |
|---|---|---|
| EP | 1221733 A2 | 7/2002 |
| EP | 1074584 B1 | 6/2005 |
| EP | 1568730 A1 | 8/2005 |
| EP | 1454938 B1 | 10/2005 |
| EP | 1524287 B1 | 1/2008 |
| EP | 1568725 B1 | 6/2008 |
| RU | 2090575 C1 | 9/1997 |

OTHER PUBLICATIONS

Krespan, Carl G, et al—"Perfluoroallyl Fluorosulfate, a Reactive New Perfluoroallylating Agent", J. Am. Chem. Soc., 1981, vol. 103, p. 5598-5599, American Chemical Society; 2 pgs.

* cited by examiner

Primary Examiner — Nicole M Buie-Hatcher
(74) Attorney, Agent, or Firm — Xuping Fu

(57) ABSTRACT

The invention pertains to novel (per)fluoropolyethers comprising at least one (per)fluoropolyoxyalkylene chain (chain $R_f$) comprising at least one recurring unit (R2) having formula: $CF_2$—$CF(CF_2OSO_2F)$—O— (poly(fluorosulfate) PFPE) to a process for their manufacture, and to their use for providing functional (per)fluoropolyethers.

16 Claims, No Drawings

US 8,557,952 B2

POLYFUNCTIONAL (PER)FLUOROPOLYETHERS

CROSS-REFERENCE TO RELATED APPLICATIONS

This application is a U.S. national stage entry under 35 U.S.C. §371 of International Application No. PCT/EP2009/066204 filed Dec. 2, 2009, which claims priority to Euroepan Application No. 08170813.3 filed Dec. 5, 2008, the whole content of such application being herein incorporated by reference for all purposes.

TECHNICAL FIELD

The invention pertains to novel (per)fluoropolyethers comprising chain recurring units comprising at least one —$CF_2OSO_2F$ side-chain functional group, to a process for manufacturing said (per)fluoropolyethers and to use of said (per)fluoropolyethers for manufacturing functional (per)fluoropolyether derivatives.

BACKGROUND ART

Polyfunctional (per)fluoropolyethers are well known in the art to be useful intermediates for the manufacture of low $T_g$ polyfunctional (per)fluoropolyether derivatives or cross-linkable macromers.

Thus, U.S. Pat. No. 5,719,259 (E. I. DU PONT DE NEMOURS AND COMPANY) 17 Feb. 1998 discloses anionic copolymerization of hexafluoropropylene oxide with a perfluoroalkylene oxide like, notably, perfluoroallylfluorosulfate oxide, in the presence of an initiator, namely a complex of a cesium perfluoroalkoxide of a hexafluoropropylene oxide oligomer and a poly(ethylene glycol)dimethyl ether, to yield polyfunctional perfluoropolyethers comprising recurring units having the following general formula: —$(CF(R_f)CF_2O)_m(CF(COF)CF_2O)_n$—, wherein $R_f$ is a $C_1$-$C_8$ perfluoroalkyl group and the m:n mole ratio ranges from 2:1 to 50:1.

The —$CF_2OSO_2F$ side-chain functional groups derived from perfluoroallylfluorosulfate oxide monomer undergo in situ nucleophilic replacement in the presence of said initiator with cleavage of the S—O bond to afford —COF functional groups, so that final polymer is exempt from such fluorosulfate groups, but rather comprises acyl fluoride moieties.

The polyfunctional perfluoropolyethers so obtained typically have a $T_g$ of from about −45° C. to −70° C.

Also, EP 1074584 B (SOLVAY SOLEXIS S.P.A.) 22 Jun. 2005 discloses perfluoropolyethers comprising —$O(CF_2)_2SO_2F$ side-chain functional groups, said perfluoropolyethers being homopolymers of $CF_2$=$CFO(CF_2)_2SO_2F$ or copolymers of said monomer with perfluoroolefins like, notably, tetrafluoroethylene (TFE) and hexafluoropropylene (HFP). It is well known that fluorosulfonic —$O(CF_2)_2SO_2F$ functional groups have a reactivity totally different from groups comprising fluorosulfate moieties. These groups are typically converted into —$O(CF_2)_2SO_3H$ groups, but cannot be easily converted in other functional moieties (e.g. amides, carboxylic esters, etc.).

Attempts were also made in the past for incorporating reactive moieties other than fluorosulfonic groups in main chain of (per)fluoropolyether derivatives by oxidative photopolymerization of ethylenically unsaturated perfluoromonomers with functional fluoroalkylenes.

EP 1568725 B (SOLVAY SOLEXIS S.P.A.) 18 Jun. 2008 discloses peroxidic perfluoropolyethers prepared by photooxidation of TFE with perfluoroethylene sulphonyl fluoride, $CF_2$=$CFSO_2F$, said perfluoropolyethers comprising two functional end groups independently selected among —$CF_2COF$, —COF and —$SO_2F$. EP 1568730 A (SOLVAY SOLEXIS S.P.A.) 31 Aug. 2005 discloses peroxidic perfluoropolyethers prepared by photooxidation of TFE with perfluoroacryloyl fluoride, $CF_2$=$CFCOF$, said perfluoropolyethers comprising two functional end groups independently selected between —$CF_2COF$ and —COF.

However, no incorporation of the $CF_2$=$CFSO_2F$ and $CF_2$=$CFCOF$ functional fluoroalkylene monomers into the perfluoropolyether main chain occurred during the radical photo-oxidative polymerization of said monomers with TFE: these monomers were thus found to only behave as chain transfer agents by cleavage of the functional group.

The need was thus felt to provide (per)fluoropolyethers comprising chain recurring units comprising at least one —$CF_2OSO_2F$ side-chain functional group to be easily derivatized into a wide range of functional (per)fluoropolyether derivatives, thanks to the versatility and reactivity of fluorosulfate group.

DISCLOSURE OF INVENTION

It is thus an object of the invention a (per)fluoropolyether comprising at least one (per)fluoropolyoxyalkylene chain (chain $R_f$) comprising at least one recurring unit (R2) having formula: —$CF_2CF(CF_2OSO_2F)$—O— (poly(fluorosulfate) PFPE).

The Applicant has surprisingly found that the (per)fluoropolyethers comprising recurring units comprising at least one —$CF_2OSO_2F$ side-chain functional group of the invention are valuable building blocks, which can be efficiently transformed into various functional (per)fluoropolyether derivatives thanks to the high reactivity and versatility of the fluorosulfate chemistry.

For the avoidance of doubt, the term "(per)fluoropolyoxyalkylene chain (chain $R_f$)" is hereby intended to denote a chain comprising recurring units (R1), said recurring units having general formula: —$(CF_2)_k$—CFZ—O—, wherein k is an integer of from 0 to 3 and Z is selected between a fluorine atom and a $C_1$-$C_5$ perfluoro(oxy)alkyl group.

The poly(fluorosulfate) PFPE typically complies with formula (I) here below:

$XO(CF_2O)_s(CF_2CF_2O)_m(CFYO)_n(CF_2CFYO)_p(CF_2CF(CF_2OSO_2F)O)_{q-(CF2}(CF_2)_zCF_2O)_r$—$(WO)_x$—$(O)_t$—$X'$ (I), the recurring units being statistically distributed along the (per)fluoropolyoxyalkylene chain, wherein:

- X and X', equal to or different from each other, are independently selected between functional groups chosen among the group consisting of —COF, —$CF_2COF$, —$CF(CF_3)COF$ and —$SO_2F$ and $C_1$-$C_3$ (per)fluoroalkyl groups optionally containing one or more hydrogen or chlorine atoms;
- Y is a $C_1$-$C_5$ perfluoro(oxy)alkyl group;
- W represents a $C_2$-$C_{50}$ chain comprising recurring units, equal to or different from each other, of formula —$(CR_1R_2$—$CR_3R_4)$—, wherein $R_1$, $R_2$, $R_3$ and $R_4$, equal to or different from each other, are independently selected among hydrogen, halogen atoms, $C_1$-$C_6$ (per)haloalkyl groups and $C_1$-$C_6$ (per)fluoro(oxy)alkyl groups;
- z is 1 or 2;
- m, n, p, r, s, t and x are integers ≥0, q is an integer ≥1.

According to a first embodiment of the invention, the poly(fluorosulfate) PFPE is a peroxidic poly(fluorosulfate) PFPE having formula (I) as described above, wherein t is >0.

The peroxidic poly(fluorosulfate) PFPE of this first embodiment preferably complies with formula (II-A) here below:

$XO(CF_2O)_s(CF_2CF_2O)_m(CF_2CF(CF_2OSO_2F)O)_q$—$(CF_2(CF_2)_zCF_2O)_r$—$(O)_t$—$(WO)_x$—$X'$ (II-A), the recurring units being statistically distributed along the (per)fluoropolyoxyalkylene chain, wherein:

X and X', equal to or different from each other, are independently selected between functional groups chosen among the group consisting of —COF, —CF$_2$COF and —SO$_2$F and C$_1$-C$_2$ (per)fluoroalkyl groups optionally containing one or more hydrogen or chlorine atoms;

W represents a C$_2$-C$_{50}$ chain comprising recurring units, equal to or different from each other, of formula —(CR$_1$R$_2$—CR$_3$R$_4$)—, wherein R$_1$, R$_2$, R$_3$ and R$_4$, equal to or different from each other, are independently selected among halogen atoms and C$_1$-C$_6$ (per)haloalkyl groups;

z is defined as above;

m, q, r and s are integers >0, x is an integer ≥0, q is an integer >1, t is an integer ≥1.

The peroxidic poly(fluorosulfate) PFPE of this first embodiment more preferably complies with formula (II-A) as described above wherein x is 0, that is to say that it complies with formula (III-A) here below:

$XO(CF_2O)_s(CF_2CF_2O)_m(CF_2CF(CF_2OSO_2F)O)_q$—$(CF_2(CF_2)_zCF_2O)_r$—$(O)_t$—$X'$ (III-A), the recurring units being statistically distributed along the (per)fluoropolyoxyalkylene chain, wherein:

X and X', equal to or different from each other, are independently selected between functional groups chosen among the group consisting of —COF, —CF$_2$COF and —SO$_2$F and C$_1$-C$_2$ (per)fluoroalkyl groups optionally containing one or more hydrogen or chlorine atoms;

z is defined as above;

m, q, r and s are integers >0, q is an integer >1, t is an integer ≥1.

The peroxidic poly(fluorosulfate) PFPE has typically a number average molecular weight ranging from 600 to 150000, preferably from 1000 to 80000, more preferably from 1500 to 70000.

The peroxidic poly(fluorosulfate) PFPE has generally a peroxidic content (P.O.) ranging from 0.05 to 3.5, preferably from 0.05 to 2.5.

The peroxidic content (P.O.) of the peroxidic poly(fluorosulfate) PFPE can be determined according to the method described in EP 1568725 B (SOLVAY SOLEXIS S.P.A.) 18 Jun. 2008.

According to a second embodiment of the invention, the poly(fluorosulfate) PFPE is a non-peroxidic poly(fluorosulfate) PFPE having formula (I) as described above, wherein t is 0.

The non-peroxidic poly(fluorosulfate) PFPE of this second embodiment preferably complies with formula (II-B) here below:

$XO(CF_2O)_s(CF_2CF_2O)_m(CF_2CF(CF_2OSO_2F)O)_q$—$(CF_2(CF_2)_zCF_2O)_r$—$(WO)_x$—$X'$ (II-B), the recurring units being statistically distributed along the (per)fluoropolyoxyalkylene chain, wherein:

X and X', equal to or different from each other, are independently selected between functional groups chosen among the group consisting of —COF, —CF$_2$COF and —SO$_2$F and C$_1$-C$_2$ (per)fluoroalkyl groups optionally containing one or more hydrogen or chlorine atoms;

W represents a C$_2$-C$_{50}$ chain comprising recurring units, equal to or different from each other, of formula —(CR$_1$R$_2$—CR$_3$R$_4$)—, wherein R$_1$, R$_2$, R$_3$ and R$_4$, equal to or different from each other, are independently selected among halogen atoms and C$_1$-C$_6$ (per)haloalkyl groups;

z is defined as above;

m, q, r and s are integers >0, x is an integer ≥0, q is an integer >1.

The non-peroxidic poly(fluorosulfate) PFPE of this second embodiment more preferably complies with formula (II-B) as described above wherein x is 0, that is to say that it complies with formula (III-B) here below:

$XO(CF_2O)_s(CF_2CF_2O)_m(CF_2CF(CF_2OSO_2F)O)_q$—$(CF_2(CF_2)_zCF_2O)_r$—$X'$ (III-B), the recurring units being statistically distributed along the (per)fluoropolyoxyalkylene chain, wherein:

X and X', equal to or different from each other, are independently selected between functional groups chosen among the group consisting of —COF, —CF$_2$COF and —SO$_2$F and C$_1$-C$_2$ (per)fluoroalkyl groups optionally containing one or more hydrogen or chlorine atoms;

z is defined as above;

m, q, r and s are integers >0, q is an integer >1.

The non-peroxidic poly(fluorosulfate) PFPE has typically a number average molecular weight ranging from 500 to 150000, preferably from 1000 to 80000, more preferably from 1500 to 70000.

The non-peroxidic poly(fluorosulfate) PFPE has generally a functionality (F) value of at least 2, preferably of at least 2.5, more preferably of at least 3.

The non-peroxidic poly(fluorosulfate) PFPE has generally a functionality (F) value of at most 50, preferably of at most 40, more preferably of at most 30.

The functionality (F) value of the non-peroxidic poly(fluorosulfate) PFPE is hereby expressed as the mole ratio of functional groups of the non-peroxidic poly(fluorosulfate) PFPE to the non-peroxidic poly(fluorosulfate) PFPE. For the avoidance of doubt, the term "functional groups of the non-peroxidic poly(fluorosulfate) PFPE" is hereby intended to denote both functional end groups, namely X and X' functional groups as described herein above, like, notably, —COF, —CF$_2$COF and —SO$_2$F, and side-chain functional groups, like —CF$_2$OSO$_2$F.

Another object of the invention is a process for manufacturing the poly(fluorosulfate) PFPE.

According to a first embodiment of the invention, the process for manufacturing the poly(fluorosulfate) PFPE of the invention comprises reacting a (per)fluoropolyether peroxide (peroxidic PFPE) with perfluoroallylfluorosulfate, CF$_2$=CFCF$_2$OSO$_2$F (FAFS).

For the avoidance of doubt, the term "(per)fluoropolyether peroxide (peroxidic PFPE)" is intended to denote a compound comprising at least one peroxidic moiety and at least one (per)fluoropolyoxyalkylene chain (chain R$_f$), the chain R$_f$ being defined as above.

The peroxidic PFPE typically complies with formula (IV) here below:

$C$—$O$—$(CFX^1O)_{c1}(CFX^2CFX^3O)_{c2}(CF_2CF_2CF_2O)_{c3}(CF_2CF_2CF_2CF_2O)_{c4}(O)_p$—$C'$ (IV), the recurring units being statistically distributed along the (per)fluoropolyoxyalkylene chain, wherein:

X$^1$, X$^2$, X$^3$, equal to or different from each other, are independently selected among a fluorine atom and C$_1$-C$_5$ perfluoro(oxy)alkyl groups;

C and C', equal to or different from each other, are independently selected between functional groups chosen among the group consisting of COF, —$CF_2COF$ and —$CF(CF_3)COF$ and $C_1$-$C_3$ (per)fluoroalkyl groups optionally containing one or more hydrogen or chlorine atoms;

c1, c2, c3, and c4, equal to or different from each other, are integers ≥0, chosen so that (c1+c2+c3+c4) is in the range between 5 and 2000, preferably between 10 and 500;

p is an integer >0.

The peroxidic PFPE has generally a number average molecular weight ranging from 400 to 150000, preferably from 1000 to 80000.

The peroxidic PFPE has typically a peroxidic content (P.O.) ranging from 0.1 to 4, preferably from 0.2 to 3.

The peroxidic content (P.O.) of the peroxidic PFPE can be determined according to the method provided in EP 1568725 B (SOLVAY SOLEXIS S.P.A.) 18 Jun. 2008.

The peroxidic PFPEs can be prepared, for example, by photoassisted oxypolymerization of tetrafluoroethylene (TFE) and/or hexafluoropropylene (HFP), in the presence of oxygen, according to the teachings of U.S. Pat. No. 3,442,942 (MONTEDISON S.P.A.) Jun. 5, 1969, U.S. Pat. No. 3,650,928 (MONTEDISON S.P.A.) 21 Mar. 1972, U.S. Pat. No. 3,665,041 (MONTEDISON S.P.A.) 23 May 1972.

The peroxidic PFPEs containing the units —$(CF_2)_k$—CFZ—O— can be prepared, for example, according to what described in U.S. Pat. No. 5,144,092 (AUSIMONT S.R.L.) Jan. 9, 1992 by polymerization, in the presence of oxygen and UV radiations, of one or more (per)fluoroalkylvinylether(s) of formula $CF_2$=$CFOX_a$, wherein $X_a$ is (R'O)$_m$R", wherein R' is selected among —$CF_2$—, —$CF_2CF_2$— and —$CF_2CF(CF_3)$—, R" is selected among $C_1$-$C_{10}$ linear perfluoroalkyls, $C_3$-$C_{10}$ branched perfluoroalkyls and $C_3$-$C_6$ cyclic perfluoroalkyls, m is an integer ranging from 0 to 6, by operating in the presence of a solvent and at a temperature not higher than 50° C. This same process can be carried out also in the presence of TFE and/or HFP. See furthermore, for example, EP 1454938 B (SOLVAY SOLEXIS S.P.A.) May 10, 2005, EP 1524287 B (SOLVAY SOLEXIS S.P.A.) Feb. 1, 2008.

The peroxidic PFPE is preferably selected from the following classes:

(A) $Xo$-$O(CF_2CF_2O)_{r1}(CF_2O)_{s1}(O)_{t1}$—$Xo'$ (IV-A) wherein:

Xo and Xo', equal to or different from each other, are independently selected among the group consisting of —$CF_2Cl$, —$CF_2CF_2Cl$, —$CF_3$, —$CF_2CF_3$, —$CF_2COF$ and —COF;

r1, s1 and t1 are integers >0 chosen so that the number average molecular weight ranges between 400 and 150000, preferably between 500 and 80000, the ratio r1/s1 being preferably comprised between 0.1 and 10.

Peroxidic PFPEs complying with formula (IV-A) here above can be prepared by oxypolymerization of TFE notably following the teachings of U.S. Pat. No. 3,715,378 (MONTEDISON S.P.A.) Jun. 2, 1973, U.S. Pat. No. 4,451,646 (MONTEDISON S.P.A.) 29 May 1984, U.S. Pat. No. 5,258,110 (AUSIMONT S.R.L.) Feb. 11, 1993, U.S. Pat. No. 5,744,651 (AUSIMONT S.R.L.) 28 Apr. 1998;

(B) $X1$-$O(CF_2CF_2O)_{r2}(CF_2O)_{s2}(CF(CF_3)O)_{u2}(CF_2CF(CF_3)O)_{v2}(O)_{t2}$—$X1'$ (IV-B) wherein:

X1 and X1', equal to or different from each other, are independently selected among the group consisting of —$CF_2Cl$, —$CF_2CF_2Cl$, —$CF_2CF_3$, —$CF_3$, —$C_3F_7$, —$CF(CF_3)COF$, —COF, —$CF_2COF$ and —$CF_2C(O)CF_3$;

r2, s2, u2, v2 are integers ≥0, r2, s2, u2, v2 being preferably >0 with the ratio v2/(r2+s2+u2) being <1, chosen so that the number average molecular weight ranges between 500 and 50000, preferably between 700 and 30000; t2 is an integer >0.

Peroxidic PFPEs complying with formula (IV-B) here above can be prepared by oxypolymerization of TFE and HFP notably following the teachings of U.S. Pat. No. 5,000,830 (AUSIMONT S.R.L.) 19 Mar. 1991 and U.S. Pat. No. 3,847,978 (MONTEDISON S.P.A.) Dec. 11, 1974;

(C) $X2$-$O(CF_2CF_2O)_{r3}(CF_2O)_{s3}(CF_2(CF_2)_wCF_2O)_{k3}(O)_{t3}$—$X2'$ (IV-C) wherein:

X2 and X2', equal to or different from each other, are independently selected between —COF and —$CF_2COF$;

w is 1 or 2;

r3, s3, and k3 are integers ≥0, r3, s3 and k3 being preferably >0 with the ratio r3/s3 being typically between 0.2 and 10 and the ratio k3/(r3+s3) being generally lower than 0.05, chosen so that the number average molecular weight ranges between 700 and 100000, preferably between 700 and 80000; t3 is an integer >0.

Peroxidic PFPEs complying with formula (IV-C) here above can be prepared following teachings of US 2005192413 (SOLVAY SOLEXIS S.P.A.) Jan. 9, 2005.

The peroxidic PFPE more preferably complies with formula (IV-C) here above.

The perfluoroallylfluorosulfate monomer (FAFS) is typically obtained by reacting HFP with sulphur trioxide in the presence of boron-based catalysts, according to the teachings of U.S. Pat. No. 4,235,804 (E.I. DUPONT DE NEMOURS AND COMPANY) 25 Nov. 1980 and KRESPAN, CARL G., et al. Perfluoroallyl fluorosulfate, a reactive new perfluoroallylating agent. *J. Am. Chem. Soc.* 1981, vol. 103, p. 5598-5599.

According to a first variant of the first embodiment of the process of the invention, the reaction of the peroxidic PFPE with $CF_2$=$CFCF_2OSO_2F$ (FAFS) is carried out in the presence of UV radiations; UV radiations employed generally have a wavelength in the range of from 200 nm to 350 nm.

According to this first variant of the first embodiment of the process of the invention, the reaction is carried out at temperatures typically ranging between −100° C. and 125° C., preferably between −50° C. and 125° C. The reaction is carried out under pressures advantageously ranging between 1 bar and 5 bar.

According to a second variant of the first embodiment of the process of the invention, the reaction of the peroxidic PFPE with $CF_2$=$CFCF_2OSO_2F$ (FAFS) is carried out in the absence of UV radiations.

According to this second variant of the first embodiment of the process of the invention, the reaction is carried out at temperatures typically ranging between 125° C. and 280° C., preferably between 160° C. and 230° C. The reaction is carried out under pressures advantageously ranging between 1 bar and 50 bar.

The reaction can be carried out in the presence of one or more fluorinated solvent(s) (S) which are able to dissolve both the peroxidic PFPE and the FAFS monomer; the use of said solvent(s) is particularly useful when the peroxidic content (P.O.) of the peroxidic PFPE is higher than 2.

Representative examples of fluorinated solvents (S) which can be used in said reaction include, notably, (per)fluorocarbons, perfluoro(poly)ethers, hydrofluoro(poly)ethers, preferably perfluoropolyethers like, e.g., GALDEN® PFPEs and hydrofluoropolyethers like, e.g., H-GALDEN® HFPEs.

The peroxidic PFPE and FAFS monomer are typically reacted in an amount such that the FAFS/peroxidic moieties mole ratio ranges between 0.1 and 50, preferably between 0.5 and 20.

A peroxidic poly(fluorosulfate) PFPE as described above is typically obtained from the reaction of the peroxidic PFPE with $CF_2$=$CFCF_2OSO_2F$ (FAFS).

It has been generally found that the peroxidic content (P.O.) of the peroxidic poly(fluorosulfate) PFPE is typically lower than the peroxidic content (P.O.) of the peroxidic PFPE, that is to say that some of the peroxidic moieties are typically reduced during the reaction of the peroxidic PFPE with $CF_2$=$CFCF_2OSO_2F$ (FAFS).

A non-peroxidic poly(fluorosulfate) PFPE as described above can be obtained by thermal or photochemical treatment of the peroxidic poly(fluorosulfate) PFPE so obtained.

The thermal treatment is carried out at temperatures typically ranging between 160° C. and 260° C., preferably between 180° C. and 240° C. The reaction is carried out under pressures advantageously ranging between 1 bar and 30 bar.

The photochemical treatment is typically carried out in the presence of UV radiations; UV radiations employed generally have a wavelength in the range of from 200 nm to 350 nm. The treatment is carried out at temperatures typically ranging between −100° C. and 100° C., preferably between −50° C. and 50° C. The treatment is carried out under pressures advantageously ranging between 1 bar and 3 bar. One or more fluorinated solvent(s) (S) as defined above can optionally be used.

During thermal or photochemical treatment of the peroxidic poly(fluorosulfate) PFPE, one or more radically homopolymerizable (per)fluoroolefin(s) can optionally be added to the reaction medium.

The radically homopolymerizable (per)fluoroolefin is preferably a perfluoroolefin.

Non-limitative examples of suitable radically homopolymerizable perfluoroolefins include, notably, tetrafluoroethylene (TFE).

The radically homopolymerizable (per)fluoroolefins can optionally be used in admixture with one or more radically non-homopolymerizable (per)fluoroolefins.

The radically non-homopolymerizable (per)fluoroolefin is preferably a perfluoroolefin.

Non-limitative examples of suitable radically non-homopolymerizable perfluoroolefins include, notably, hexafluoropropylene (HFP) and perfluorovinylethers.

A non-peroxidic poly(fluorosulfate) PFPE complying with formula (II-B) as described above wherein x is >0 can be obtained by thermal or photochemical treatment of the peroxidic poly(fluorosulfate) PFPE while in the presence of said radically homopolymerizable (per)fluoroolefin(s), optionally in admixture with radically non-homopolymerizable (per) fluoroolefin(s).

The reaction of the peroxidic PFPE with $CF_2$=$CFCF_2OSO_2F$ (FAFS) can be also carried out until complete reduction of the peroxidic moieties to directly yield the non-peroxidic poly(fluorosulfate) PFPE as described above without passing through the intermediate peroxidic poly(fluorosulfate) PFPE.

According to a second embodiment of the invention, the process for manufacturing the poly(fluorosulfate) PFPE of the invention comprises the oxidative photopolymerization of at least one ethylenically unsaturated perfluoromonomer with $CF_2$=$CFCF_2OSO_2F$ (FAFS).

Non limitative examples of suitable ethylenically unsaturated perfluoromonomers include, notably, TFE, optionally in the presence of one or more $C_3$-$C_5$ alfa-fluoroolefins like, e.g., HFP and/or perfluoroalkylvinylethers having general formula $CF_2$=$CFOR_f'$, wherein $R_f'$ is a $C_1$-$C_5$ perfluoro(oxy)alkyl group like, e.g., perfluoromethyl-, perfluoroethyl-, perfluoropropylvinylether.

The ethylenically unsaturated perfluoromonomer is preferably TFE, optionally in the presence of HFP.

The oxidative photopolymerization of this second embodiment is carried out with oxygen under UV radiations; UV radiations employed typically have a wavelength in the range of from 200 nm to 350 nm. The oxidative photopolymerization is carried out at temperatures generally ranging between −30° C. and −100° C. One or more fluorinated solvent(s) (S') are typically used.

The fluorinated solvents (S') are generally liquid under the reaction conditions.

Non limitative examples of suitable fluorinated solvents (S') include, notably, perfluorocarbons and hydrofluorocarbons having formula $C_yF_{(2y+2-x)}H_x$, wherein y is an integer ranging from 2 to 4 and x is 0 or 1, and chlorofluorocarbons.

The fluorinated solvents (S') are preferably selected among the followings: perfluoropropane, perhydropentafluoroethane, 2-hydroheptafluoropropane and mixtures thereof.

The oxidative photopolymerization of this second embodiment is generally carried out in a semi-continuous or continuous way.

The oxygen is typically fed in molar excess with respect to the ethylenically unsaturated perfluoromonomer(s); the oxygen/ethylenically unsaturated perfluoromonomer(s) mole ratio generally ranges between 1.1 and 3.

The perfluoroallyl fluorosulfate (FAFS) monomer is typically fed in its gaseous or liquid phase. The FAFS is generally fed simultaneously with the oxygen and the ethylenically unsaturated perfluoromonomer(s). The FAFS/ethylenically unsaturated perfluoromonomer(s) mole ratio generally ranges between 0.001 and 0.5, more preferably between 0.005 and 0.4.

A peroxidic poly(fluorosulfate) PFPE as described above is typically obtained by the process of this second embodiment.

A non-peroxidic poly(fluorosulfate) PFPE as described above can be obtained by thermal or photochemical treatment of the peroxidic poly(fluorosulfate) PFPE as described herein above in the first embodiment of the process of the invention.

Another object of the invention is use of the poly(fluorosulfate) PFPE for manufacturing functional (per)fluoropolyether derivatives.

For the avoidance of doubt, the term "functional (per) fluoropolyether derivative" is hereby intended to denote a (per)fluoropolyether comprising at least one (per)fluoropolyoxyalkylene chain (chain $R_f$) as defined above comprising at least one recurring unit (R3) having formula —$CF_2CF(T)$-O—, wherein T is a functional group selected among carboxylic acid, acyl fluoride, amide and ester groups.

The functional (per)fluoropolyether derivative typically complies with formula (V) here below: $XO(CF_2O)_s$ $(CF_2CF_2O)_m(CF_2CF(T)O)_q$—$(CF_2(CF_2)_zCF_2O)_r$—$(O)_t$—$(WO)_x$—$X'$ (V), the recurring units being statistically distributed along the (per)fluoropolyoxyalkylene chain, wherein:

X and X', equal to or different from each other, are independently selected between functional groups chosen between -T and —$CF_2T$ and $C_1$-$C_2$ (per)fluoroalkyl groups optionally containing one or more hydrogen or chlorine atoms;

W represents a $C_2$-$C_{50}$ chain comprising recurring units, equal to or different from each other, of formula —($CR_1R_2$—$CR_3R_4$)—, wherein $R_1$, $R_2$, $R_3$ and $R_4$, equal to or different from each other, are independently selected among halogen atoms and $C_1$-$C_6$ (per)haloalkyl groups;

T is a functional group selected among carboxylic acid, acyl fluoride, amide and ester groups;

z is defined as above;

m, q, r and s are integers >0, t and x are integers ≥0, q is an integer >1.

The functional (per)fluoropolyether derivative more preferably complies with formula (V) as described above wherein x is 0, that is to say that it complies with formula (VI) here below:

XO($CF_2O$)$_s$($CF_2CF_2O$)$_m$($CF_2CF(T)O$)$_q$—($CF_2$($CF_2$)$_z$$CF_2O$)$_r$—(O)$_t$—X' (VI), the recurring units being statistically distributed along the (per)fluoropolyoxyalkylene chain, wherein:

X and X', equal to or different from each other, are independently selected between functional groups chosen between -T and —$CF_2T$ and $C_1$-$C_2$ (per)fluoroalkyl groups optionally containing one or more hydrogen or chlorine atoms;

T is a functional group selected among carboxylic acid, acyl fluoride, amide and ester groups;

z is defined as above;

m, q, r and s are integers >0, t is an integer ≥0, q is an integer >1.

The functional (per)fluoropolyether derivative has typically a number average molecular weight ranging from 400 to 150000, preferably from 1500 to 70000.

The functional (per)fluoropolyether derivative has generally a functionality (F) value ranging from 2 to 50, preferably from 2.5 to 40, more preferably from 3 to 30.

The functionality (F) value of the functional (per)fluoropolyether derivative is hereby expressed as the mole ratio of functional groups of the functional (per)fluoropolyether derivative to the functional (per)fluoropolyether derivative. For the avoidance of doubt, the term "functional groups of the functional (per)fluoropolyether derivative" is hereby intended to denote functional end groups, namely X and X' functional groups as described herein above in formulae (V) and (VI) like, notably, -T and —$CF_2T$, and side-chain functional groups, namely T functional groups, wherein T has the meaning as described above.

The functional (per)fluoropolyether derivatives are generally obtained by reacting the poly(fluorosulfate) PFPE with a nucleophilic agent. The reaction is carried out at temperatures typically ranging between 0° C. and 200° C., preferably between 40° C. and 150° C. One or more fluorinated solvent(s) (S) as defined above can optionally be used.

Non-limitative examples of suitable nucleophilic agents include, notably, metal halogenides, alcoholates, amines.

Poly(acyl fluoride) PFPEs complying with formula (V) or (VI) as described above wherein the functional group T is —COF can be obtained by reacting the poly(fluorosulfate) PFPE with a nucleophilic agent selected among metal halogenides.

The metal halogenide is typically selected among Group I and II metal halogenides and transition metal halogenides having basic character, such as e.g. Ag.

The metal halogenide is preferably selected among Group I and II metal fluorides, more preferably among alkali metal fluorides like, notably, caesium fluoride and potassium fluoride.

The metal halogenide is generally used in stoichiometric amount with respect to the fluorosulfate groups of the poly(fluorosulfate) PFPE. Catalytic amounts of metal halogenides may also be used.

The poly(acyl fluoride) PFPEs can also be obtained by hydrolysis of the fluorosulfate groups of the poly(fluorosulfate) PFPEs to yield corresponding compounds having carboxylic moieties and subsequent fluorination of said carboxylic moieties into the target acyl fluoride moieties.

Hydrolysis is preferably accomplished by alkaline hydrolysis with an aqueous inorganic base, e.g. with aqueous KOH, followed by treatment with an aqueous acidic solution (e.g. $HCl_{aq}$) for obtaining carboxylic acids. Fluorination of the carboxylic moieties can be performed:

either by chlorination with $SOCl_2$ (or other suitable chlorinating agent) and subsequent reaction of corresponding acyl chloride with KF (or other suitable fluoride source) to obtain the acyl fluoride moieties; or by treatment of carboxylic acid with a suitable fluorinating agent like, notably, fluoroalkylamine reagents such as the Yarovenko's reagent ($Et_2N.CF_2CFClH$) or the Ishikawa's reagent ($Et_2N.CF_2CFHCF_3$) for directly yielding the target acyl fluoride moieties.

Polyester PFPEs complying with formula (V) or (VI) as described above wherein the functional group T is an ester group can be obtained by reacting the poly(fluorosulfate) PFPE with a nucleophilic agent selected among alcoholates.

Representative examples of alcoholates which can be used in said reaction include aliphatic and aromatic alcoholates.

Aliphatic alcoholates are preferably selected among $C_1$-$C_{10}$ saturated alcoholates and $C_3$-$C_{10}$ unsaturated alcoholates, more preferably among $C_1$-$C_6$ saturated alcoholates and $C_3$-$C_6$ unsaturated alcoholates.

Aromatic alcoholates are preferably based on aromatic compounds having one or more aromatic ring(s) and optionally containing one or more heteroatom(s) in said aromatic ring(s), wherein the ring(s) may optionally be substituted by one or more alkyl or aryl group(s). The aromatic alcoholates are more preferably represented by phenates which may optionally be substituted by one or more $C_1$-$C_4$ alkyl group(s).

The alcoholate is typically used in molar excess with respect to the fluorosulfate groups of the poly(fluorosulfate) PFPE; the alcoholate/fluorosulfate groups mole ratio is typically ≥3.

Polyamide PFPEs complying with formula (V) or (VI) as described above wherein the functional group T is an amide group can be obtained by reacting the poly(fluorosulfate) PFPE with a nucleophilic agent selected among ammonia and amines.

The nucleophilic agent is preferably selected among ammonia and $C_1$-$C_{18}$ primary and secondary aliphatic amines, more preferably among ammonia and $C_1$-$C_4$ primary and secondary aliphatic amines.

The ammonia and the amine are typically used in molar excess with respect to the fluorosulfate groups of the poly(fluorosulfate) PFPE; the ammonia/fluorosulfate groups and the amine/fluorosulfate groups mole ratios are typically ≥3.

As shown herein before, derivatization of the poly(fluorosulfate) PFPE with nucleophilic agents advantageously enables obtaining a wide range of functional (per)fluoropolyether derivatives in a high-yield one-step reaction.

The Applicant has also found that low $T_g$ functional (per)fluoropolyether derivatives having a $T_g$ typically of less than −70° C. can be successfully obtained which can be advantageously used in several low temperature applications.

The invention will be now described in more detail with reference to the following examples whose purpose is merely illustrative and not limitative of the scope of the invention.

EXAMPLE 1

Step 1a: Reaction of a Peroxidic PFPE with FAFS

A peroxidic PFPE (20 g) having formula: X—O(CF$_2$CF$_2$O)$_m$(CF$_2$O)$_n$(CF$_2$(CF$_2$)$_z$CF$_2$O)$_r$(O)$_h$—X', wherein X and X' independently represent —COF and —CF$_2$COF, z is 1 or 2, m/n is 1.20, r/(m+n) is 0.0053, h/(n+m+r) is 0.069, the peroxidic PFPE having a number average molecular weight of 55000 and a P.O. of 1.17, FAFS (20 g) and GALDEN® HT230 PFPE (60 g) were introduced in a 250 ml stainless steel autoclave.

The so-obtained mixture was heated at 180° C. for 30 minutes and then at 190° C. for 1 hour, then cooled down to room temperature.

Unreacted FAFS (19 g) and GALDEN® HT230 PFPE were recovered by fractional distillation at reduced pressure.

Step 1b: Thermal Treatment

The distillation residue obtained as in Example 1, step 1a, was introduced in a three-necked flask equipped with a magnetic stirring bar, a bubble cooling pipe, a thermocouple thermometer and dipping pipes for feeding nitrogen (5 Nl/h) and heated according to the following step heat treatment: 210° C. (30 minutes), 220° C. (1 hour), 240° C. (2 hours). At the end of this reaction time, a non-peroxidic poly(fluorosulfate) PFPE was recovered (18 g) which was characterized by $^{19}$F-NMR spectroscopy and was found to comply with the following formula:

XO(CF$_2$O)$_s$(CF$_2$CF$_2$O)$_m$(CF$_2$CF(CF$_2$OSO$_2$F)O)$_q$—(CF$_2$(CF$_2$)$_z$CF$_2$O)$_r$—X', wherein X and X' independently represent —COF and —CF$_2$COF, z is 1 or 2, q is 9.8, m/s is 1.0, r/(m+s) is 0.0048, q/(m+r+s) is 0.019, the non-peroxidic poly(fluorosulfate) PFPE having a number average molecular weight of 49500 and a functionality (F) value of 11.8.

Step 1c: Derivatization into a Poly9Acyl Fluoride) PFPE

Potassium fluoride (0.12 g) was introduced under nitrogen in a 50 ml three-necked flask equipped with a magnetic stirring bar, a bubble cooling pipe, a dropping funnel and a thermocouple thermometer and was heated at 220° C. for 2 hours. Anhydrous potassium fluoride was thus obtained which was then cooled down to room temperature.

10 g of the non-peroxidic poly(fluorosulfate) PFPE obtained as in Example 1, step 1b, were then dropwise added thereto. At the end of the addition, the mixture so-obtained was heated at 120° C. for 3 hours under vigorous stirring and then cooled down to room temperature.

A functional perfluoropolyether derivative was recovered by filtration (9.6 g, yield: 96%) which was characterized by $^{19}$F-NMR spectroscopy and was found to comply with the following formula:

XO(CF$_2$O)$_s$(CF$_2$CF$_2$O)$_m$(CF$_2$CF(COF)O)$_q$—(CF$_2$(CF$_2$)$_z$CF$_2$O)$_r$—X', wherein X and X' represent —CF$_2$COF, z is 1 or 2, m/s is 1.0, r/(m+s) is 0.0048, q/(m+r+s) is 0.019, the functional perfluoropolyether derivative having a number average molecular weight of 48400 and a functionality (F) value of 11.8.

The functional perfluoropolyether derivative so-obtained was found to have a glass transition temperature (T$_g$) of −104° C., as determined according to ASTM 3418.

EXAMPLE 2

Same procedure as detailed in Example 1, step 1a, was followed, but the so-obtained mixture was heated according to the following step heat treatment: 180° C. (30 minutes), 190° C. (30 minutes), 200° C. (30 minutes), 210° C. (30 minutes), 220° C. (1 hour), 230° C. (2 hours).

Unreacted FAFS (18 g) and GALDEN® HT230 PFPE were recovered by fractional distillation at reduced pressure.

A non-peroxidic poly(fluorosulfate) PFPE was recovered (18.9 g) which was characterized by $^{19}$F-NMR spectroscopy and was found to comply with the following formula: XO(CF$_2$O)$_s$(CF$_2$CF$_2$O)$_m$(CF$_2$CF(CF$_2$OSO$_2$F)O)$_q$—(CF$_2$(CF$_2$)$_z$CF$_2$O)$_r$—X', wherein X and X' independently represent —COF and —CF$_2$COF, z is 1 or 2, q is 19.7, m/s is 0.97, r/(m+s) is 0.0049, q/(m+r+s) is 0.038, the non-peroxidic poly(fluorosulfate) PFPE having a number average molecular weight of 52000 and a functionality (F) value of 21.7.

EXAMPLE 3

Step 3a: Oxidative Photopolymerization of TFE with FAFS

A 500 ml cylindrical photochemical reactor was used, equipped with an inner coaxial quartz sheath wherein a high pressure mercury lamp type HANAU TQ 150 was inserted, cooled by means of a circulating fluid, e.g. GALDEN® D100 PFPE, which is transparent to UV radiations emitted by the lamp, and also equipped with dipping pipes for introducing the gases, with a sheath with a thermocouple for taking the inside temperature and with a reflux cooler maintained at a temperature of −75° C.

The reactor was cooled to −55° C. by an external GALDEN® SV90 PFPE/dry ice bath and charged with 660 g of a perfluoropropane/pentafluoroethane solvent mixture with a molar ratio of 1:1. The lamp was switched on and a gaseous mixture of oxygen (10 Nl/h), TFE (4.6 Nl/h) and FAFS (0.38 Nl/h) diluted with nitrogen (2.56 Nl/h) was bubbled into the reactor during the entire run.

After a four-hour irradiation the lamp was switched off, degassing was carried out and the unreacted solvents and gaseous by-products were recovered from the reactor by evaporation at room temperature.

A peroxidic poly(fluorosulfate) PFPE was recovered (39.5 g) which was characterized by $^{19}$F-NMR spectroscopy and was found to comply with the following formula: XO(CF$_2$O)$_s$(CF$_2$CF$_2$O)$_m$(CF$_2$CF(CF$_2$OSO$_2$F)O)$_q$—(CF$_2$(CF$_2$)$_z$CF$_2$O)$_r$—(O)$_t$—X', wherein X and X' independently represent —COF (47.9% by moles) and —CF$_2$COF (50.3% by moles), z is 1 or 2, q is 3.0, m/s is 0.78, r/(m+s) is 0.0047, t/(m+r+s) is 0.091, q/(m+r+s) is 0.061, the peroxidic poly(fluorosulfate) PFPE having a number average molecular weight of 5300, a functionality (F) value of 5.0 and a P.O. of 1.3.

Step 3b: Thermal Treatment

Same procedure as detailed in Example 1, step 1b, was followed, but 30 g of the peroxidic poly(fluorosulfate) PFPE obtained as in Example 3, step 3a, were submitted to the following step heat treatment: 160° C. (1 hour), 180° C. (1 hour), 200° C. (2 hours), 230° C. (5 hours).

At the end of this reaction time, a non-peroxidic poly(fluorosulfate) PFPE was recovered (24.2 g, yield: 80%) which was characterized by $^{19}$F-NMR spectroscopy and was found to comply with the following formula:

XO(CF$_2$O)$_s$(CF$_2$CF$_2$O)$_m$(CF$_2$CF(CF$_2$OSO$_2$F)O)$_q$—(CF$_2$(CF$_2$)$_z$CF$_2$O)$_r$—X', wherein X and X' independently represent —COF (49.9% by moles), —CF$_2$COF (8.8% by moles), —SO$_2$F (40.3% by moles) and —CF$_3$ (1% by moles), z is 1 or 2, q is 2.8, m/s is 0.76, r/(m+s) is 0.023, q/(m+r+s) is 0.057, the non-peroxidic poly(fluorosulfate) PFPE having a number average molecular weight of 4300 and a functionality (F) value of 4.8.

Step 3.1c: Derivatization into a Poly(Acyl Fluoride) PFPE

Same procedure as detailed in Example 1, step 1c, was followed, but introducing in the flask 0.28 g of potassium fluoride and reacting the corresponding anhydrous potassium fluoride with 9.5 g of the non-peroxidic poly(fluorosulfate) PFPE obtained as in Example 3, step 3b. A functional perfluoropolyether derivative was recovered by filtration (8.6 g, yield: 91%) which was characterized by $^{19}$F-NMR spectroscopy and was found to comply with the following formula:

$XO(CF_2O)_s(CF_2CF_2O)_m(CF_2CF(COF)O)_q$—$(CF_2(CF_2)_z CF_2O)_r$—$X'$, wherein X and X' independently represent —$CF_2COF$ (99% by moles) and —$CF_3$ (1% by moles), z is 1 or 2, q is 2.8, m/s is 0.72, r/(m+s) is 0.022, q/(m+r+s) is 0.059, the functional perfluoropolyether derivative having a number average molecular weight of 4000 and a functionality (F) value of 4.8. The functional perfluoropolyether derivative so-obtained was found to have a glass transition temperature ($T_g$) of $-109°$ C., as determined according to ASTM 3418.

Step 3.2c: Derivatization into a Polyester PFPE

A solution of the non-peroxidic poly(fluorosulfate) PFPE (8 g) obtained as in Example 3, step 3b, in GALDEN® HT55 PFPE (30 ml) was dropwise added at room temperature, under stirring, to a 50 ml flask containing sodium methylate (1.5 g) dissolved in anhydrous methanol (20 ml). The mixture so-obtained was refluxed for 2 hours and then cooled down to room temperature.

The lower fluorinated phase was separated and filtered on a 0.45 μm PTFE filter.

A polyester PFPE was recovered by fractional distillation (7.1 g) which was characterized by $^{19}$F-NMR spectroscopy and FT-IR analyses and exhibited complete conversion of both the —$CF_2OSO_2F$ fluorosulfate groups and the —COF end-group into the corresponding —$COOCH_3$ methylester groups.

Step 3.3c: Derivatization into a Polyamide PFPE

A solution of the non-peroxidic poly(fluorosulfate) PFPE (8 g) obtained as in Example 3, step 3b, in H-GALDEN® ZV60 HFPE (50 ml) was poured into a 100 ml flask. Temperature was raised to 50° C. and gaseous ammonia (2 NI/h) was bubbled into the solution, while stirring, for 2 hours. The solution so-obtained was cooled down to room temperature and then filtered on a 0.45 μm PTFE filter.

A polyamide PFPE was recovered by fractional distillation (6.9 g) which was characterized by $^{19}$F-NMR spectroscopy and FT-IR analyses and exhibited complete conversion of both the —$CF_2OSO_2F$ fluorosulfate groups and the —COF end-groups into the corresponding —$CONH_2$ amide groups.

EXAMPLE 4

Step 4a: Oxidative Photopolymerization of TFE with FAFS

Same procedure as detailed in Example 3, step 3a, was followed, but charging the reactor with 800 g of a perfluoropropane/pentafluoroethane solvent mixture with a molar ratio of 1:1 and bubbling into the reactor a gaseous mixture of oxygen (24 NI/h), TFE (12 NI/h) and FAFS (0.23 NI/h) during 4 hours.

A peroxidic poly(fluorosulfate) PFPE was recovered (120.5 g) which was characterized by $^{19}$F-NMR spectroscopy and was found to comply with the following formula: $XO(CF_2O)_s(CF_2CF_2O)_m(CF_2CF(CF_2OSO_2F)$ $O)_q$—$(CF_2(CF_2)_zCF_2O)_r$—$(O)_t$—$X'$, wherein X and X' independently represent —COF (41.7% by moles), —$CF_2COF$ (9.6% by moles), —$SO_2F$ (48.7% by moles) and —$CF_3$ (1% by moles), z is 1 or 2, q is 2.7, m/s is 1.38, r/(m+s) is 0.0117, t/(m+r+s) is 0.191, q/(m+r+s) is 0.017, the peroxidic poly(fluorosulfate) PFPE having a number average molecular weight of 20900, a functionality (F) value of 4.7 and a P.O. of 2.5.

Step 4b: Thermal Treatment

Same procedure as detailed in Example 3, step 3b, was followed.

A non-peroxidic poly(fluorosulfate) PFPE was recovered (21.9 g, yield: 73%) which was characterized by $^{19}$F-NMR spectroscopy and was found to comply with the following formula:

$XO(CF_2O)_s(CF_2CF_2O)_m(CF_2CF(CF_2OSO_2F)O)_q$—$(CF_2(CF_2)_zCF_2O)_r$—$X'$, wherein X and X' independently represent —COF (25.8% by moles), —$CF_2COF$ (29.9% by moles), —$SO_2F$ (43.3% by moles) and —$CF_3$ (1% by moles), z is 1 or 2, q is 2.3, m/s is 1.22, r/(m+s) is 0.037, q/(m+r+s) is 0.014, the non-peroxidic poly(fluorosulfate) PFPE having a number average molecular weight of 17100 and a functionality (F) value of 4.3.

Step 4c: Derivatization into a Poly(Acyl Fluoride) PFPE

Same procedure as detailed in Example 1, step 1c, was followed, but introducing in the flask 0.16 g of potassium fluoride and reacting the corresponding anhydrous potassium fluoride with 7.06 g of the non-peroxidic poly(fluorosulfate) PFPE obtained as in Example 4, step 4b. A functional perfluoropolyether derivative was recovered by filtration (6.8 g, yield: 96%) which was characterized by $^{19}$F-NMR spectroscopy and was found to comply with the following formula:

$XO(CF_2O)_s(CF_2CF_2O)_m(CF_2CF(COF)O)_q$—$(CF_2(CF_2)_z CF_2O)_r$—$X'$, wherein X and X' independently represent —$CF_2COF$ (99% by moles) and —$CF_3$ (1% by moles), z is 1 or 2, q is 2.5, m/s is 1.21, r/(m+s) is 0.038, q/(m+r+s) is 0.018, the functional perfluoropolyether derivative having a number average molecular weight of 16700 and a functionality (F) value of 4.5. The functional perfluoropolyether derivative so-obtained was found to have a glass transition temperature ($T_g$) of $-108°$ C., as determined according to ASTM 3418.

EXAMPLE 5

300 g of the peroxidic poly(fluorosulfate) PFPE obtained as in Example 2, step 2a, and 600 g of GALDEN® HT230 PFPE were introduced in a 1 lt. flask, equipped with a magnetic stirring bar, a thermocouple thermometer and dipping pipes for introducing nitrogen and/or TFE.

Step 5a: Thermal Treatment

The mixture so-obtained was heated to 190° C., while stirring, under a flow of nitrogen (1 NI/h) and then the flow of nitrogen was interrupted and switched to a flow of TFE (7 NI/h).

The mixture was heated according to the following step heat treatment: 190° C. (1.5 hours), 200° C. (1.5 hours), 210° C. (1 hour).

After this reaction time, the feeding of TFE was interrupted and switched to a flow of nitrogen (3 NI/h) which was maintained during 3 hours. A non-peroxidic poly(fluorosulfate) PFPE was recovered.

Step 5b: Derivatization into Poly(Acyl Fluoride) PFPE

Same procedure as detailed in Example 1, step 1c, was followed, but reacting the non-peroxidic poly(fluorosulfate)

PFPE obtained as in Example 5, step 5a, with 8 g of anhydrous potassium fluoride in the presence of 300 g of GALDEN® HT230 PFPE.

A functional perfluoropolyether derivative was recovered by filtration (270 g) which was characterized by $^{19}$F-NMR spectroscopy and was found to comply with the following formula:

$XO(CF_2O)_s(CF_2CF_2O)_m(CF_2CF(COF)O)_q$—$(CF_2(CF_2)_zCF_2O)_r$—$(W)_x$—$X'$, wherein X and X' independently represent —$CF_2COF$ (99.1% by moles) and —$CF_3$ (0.9% by moles), W is —$((CF_2CF_2)_j$—$O)$—, wherein j ranges from 6 to 8, z is 1 or 2, q is 3.0, m/s is 0.79, r/(m+s) is 0.0064, q/(m+r+s) is 0.060, x/(m+r+s) is 0.018, the functional perfluoropolyether derivative having a number average molecular weight of 5100 and a functionality (F) value of 5.0.

EXAMPLE 6

Step 6a: Reaction of a Peroxidic PFPE with FAFS

Same procedure as detailed in Example 1, step 1a, was followed.

Step 6b: Thermal Treatment

Same procedure as detailed in Example 1, step 1b, was followed, but heating the distillation residue obtained as in Example 6, step 6a, to 200° C. in the presence of 40 g of GALDEN® HT230 PFPE.

A gaseous mixture of TFE and HFP (0.8 Nl/h, 1:1 molar ratio) was then bubbled therein while the temperature was raised according to the following step heat treatment: 200° C. (1.5 hours), 210° C. (1.5 hours), 220° C. (1.5 hours).

A non-peroxidic poly(fluorosulfate) PFPE was recovered by fractional distillation (24 g) which was characterized by $^{19}$F-NMR spectroscopy and was found to comply with the following formula:

$XO(CF_2O)_s(CF_2CF_2O)_m(CF_2CF(CF_2OSO_2F)O)_q$—$(CF_2(CF_2)_zCF_2O)_r$—$(W)_x$—$X'$, wherein X and X' independently represent —COF and —$CF_2COF$, W is —$((CF_2CF_2)_p(CF_2CF(CF_3))_{p'}O)$—, wherein p/p' is 5 and (p+p') is 18, z is 1 or 2, q is 9.8, x is 9.5, m/s is 1.0, r/(m+s) is 0.0046, q/(m+r+s) is 0.019, x/(m+r+s) is 0.018, the functional perfluoropolyether derivative having a number average molecular weight of 67900 and a functionality (F) value of 11.8.

Step 6c: Derivatization into a Poly(Acyl Fluoride) PFPE

Same procedure as detailed in Example 1, step 1c, was followed, but introducing 10 g of the non-peroxidic poly(fluorosulfate) PFPE obtained as in Example 6, step 6b, in the presence of 40 g of GALDEN® HT230 PFPE. A functional perfluoropolyether derivative was recovered by filtration (9.4 g) which was characterized by $^{19}$F-NMR spectroscopy and was found to comply with the following formula:

$XO(CF_2O)_s(CF_2CF_2O)_m(CF_2CF(COF)O)_q$—$(CF_2(CF_2)_zCF_2O)_r$—$W_x$—$X'$, wherein X and X' —$CF_2COF$, W is —$((CF_2CF_2)_p(CF_2CF(CF_3))_{p'}O)$—, wherein p/p' is 5 and (p+p') is 18, z is 1 or 2, q is 9.8, x is 9.5, m/s is 1.0, r/(m+s) is 0.0046, q/(m+r+s) is 0.019, x/(m+r+s) is 0.018, the functional perfluoropolyether derivative having a number average molecular weight of 66800 and a functionality (F) value of 11.8.

The functional perfluoropolyether derivative so-obtained was found to have a glass transition temperature ($T_g$) of −102° C., as determined according to ASTM 3418.

The invention claimed is:

1. A (per)fluoropolyether comprising at least one (per)fluoropolyoxyalkylene chain (chain $R_f$) comprising at least one recurring unit (R2) having formula: —$CF_2CF(CF_2OSO_2F)$—O— (poly(fluorosulfate) PFPE).

2. The poly(fluorosulfate) PFPE of claim 1, wherein the chain $R_f$ comprises recurring units (R1), said recurring units having general formula: —$(CF_2)_k$—CFZ—O—, wherein k is an integer of from 0 to 3, and wherein Z is selected between a fluorine atom and a $C_1$-$C_5$ perfluoro(oxy)alkyl group.

3. The poly(fluorosulfate) PFPE of claim 1 complying with formula (I) here below:

X—$O(CF_2O)_s(CF_2CF_2O)_m(CFYO)_n(CF_2CFYO)_p(CF_2CF(CF_2OSO_2F)O)_q$—$(CF_2(CF_2)_zCF_2O)_r$—$(WO)_x$—$(O)_t$—$X'$ (I), the recurring units being statistically distributed along the (per)fluoropolyoxyalkylene chain, wherein:

X and X', equal to or different from each other, are functional groups independently selected from the group consisting of —COF, —$CF_2COF$, —$CF(CF_3)COF$ and —$SO_2F$ and $C_1$-$C_3$ (per)fluoroalkyl groups optionally containing one or more hydrogen or chlorine atoms;

Y is a $C_1$-$C_5$ perfluoro(oxy)alkyl group;

W represents a $C_2$-$C_{50}$ chain comprising recurring units, equal to or different from each other, of formula —$(CR_1R_2$—$CR_3R_4)$—, wherein $R_1$, $R_2$, $R_3$ and $R_4$, equal to or different from each other, are independently selected from the group consisting of hydrogen, halogen atoms, $C_1$-$C_6$ (per)haloalkyl groups and $C_1$-$C_6$ (per)fluoro(oxy)alkyl groups;

z is 1 or 2;

m, n, p, r, s, t and x are integers ≥0, and q is an integer ≥1.

4. The poly(fluorosulfate) PFPE of claim 1 complying with formula (II-A) here below: $XO(CF_2O)_s(CF_2CF_2O)_m(CF_2CF(CF_2OSO_2F)O)_q$—$(CF_2(CF_2)_zCF_2O)_r$—$(O)_t$—$(WO)_x$—$X'$ (II-A), the recurring units being statistically distributed along the (per)fluoropolyoxyalkylene chain, wherein:

X and X', equal to or different from each other, are functional groups independently selected from the group consisting of —COF, —$CF_2COF$, —$SO_2F$ and $C_1$-$C_2$ (per)fluoroalkyl groups optionally containing one or more hydrogen or chlorine atoms;

W represents a $C_2$-$C_{50}$ chain comprising recurring units, equal to or different from each other, of formula —$(CR_1R_2$—$CR_3R_4)$—, wherein $R_1$, $R_2$, $R_3$ and $R_4$, equal to or different from each other, are independently selected among halogen atoms and $C_1$-$C_6$ (per)haloalkyl groups;

z is 1 or 2;

m, q, r and s are integers >0, x is an integer ≥0, q is an integer >1, and t is an integer ≥1.

5. The poly(fluorosulfate) PFPE of claim 1 complying with formula (II-B) here below: X—$O(CF_2O)_s(CF_2CF_2O)_m(CF_2CF(CF_2OSO_2F)O)_q$—$(CF_2(CF_2)_zCF_2O)_r$—$(WO)_x$—$X'$ (II-B), the recurring units being statistically distributed along the (per)fluoropolyoxyalkylene chain, wherein:

X and X', equal to or different from each other, are functional groups independently selected from the group consisting of —COF, —$CF_2COF$, —$SO_2F$, and $C_1$-$C_2$ (per)fluoroalkyl groups optionally containing one or more hydrogen or chlorine atoms;

W represents a $C_2$-$C_{50}$ chain comprising recurring units, equal to or different from each other, of formula —$(CR_1R_2$—$CR_3R_4)$—, wherein $R_1$, $R_2$, $R_3$ and $R_4$, equal to or different from each other, are independently selected from the group consisting of halogen atoms and $C_1$-$C_6$ (per)haloalkyl groups;

z is 1 or 2;

m, q, r and s are integers >0, x is an integer ≥0, and q is an integer >1.

6. A process for manufacturing the poly(fluorosulfate) PFPE of claim 1 comprising the step of reacting a (per)fluoropolyether peroxide (peroxidic PFPE) with $CF_2=CFCF_2OSO_2F$ (FAFS).

7. The process of claim 6, wherein the peroxidic PFPE complies with formula (IV) here below: C—O—$(CFX^1O)_{c1}$—$(CFX^2CFX^3O)_{c2}(CF_2CF_2CF_2O)_{c3}(CF_2CF_2CF_2CF_2O)_{c4}$—$(O)_p$—C' (IV), the recurring units being statistically distributed along the (per)fluoropolyoxyalkylene chain, wherein:

$X^1$, $X^2$, $X^3$, equal to or different from each other, are independently selected from the group consisting of a fluorine atom and $C_1$-$C_5$ perfluoro(oxy)alkyl groups;

C and C', equal to or different from each other, are functional groups independently selected from the group consisting of COF, —$CF_2COF$, —$CF(CF_3)COF$, and $C_1$-$C_3$ (per)fluoroalkyl groups optionally containing one or more hydrogen or chlorine atoms;

c1, c2, c3, and c4, equal to or different from each other, are integers ≥0, chosen so that (c1+c2+c3+c4) is in the range between 5 and 2000; and p is an integer >0.

8. A process for manufacturing the poly(fluorosulfate) PFPE of claim 1 comprising the step of oxidatively photopolymerizing at least one ethylenically unsaturated perfluoromonomer with $CF_2=CFCF_2OSO_2F$ (FAFS).

9. The process of claim 8, wherein the ethylenically unsaturated perfluoromonomer is tetrafluoroethylene (TFE) and/or hexafluoropropylene (HFP).

10. A method for manufacturing a functional (per)fluoropolyether derivative comprising the step of utilizing the poly(fluorosulfate) PFPE of claim 1.

11. The method according to claim 10, wherein the functional (per)fluoropolyether derivative complies with formula (V) here below:

$XO(CF_2O)_s(CF_2CF_2O)_m(CF_2CF(T)O)_q$—$(CF_2(CF_2)_zCF_2O)_r$—$(O)_t$—$(WO)_x$—X' (V), the recurring units being statistically distributed along the (per)fluoropolyoxyalkylene chain, wherein:

X and X', equal to or different from each other, are functional groups independently selected from the group consisting of -T and —$CF_2T$ and $C_1$-$C_2$ (per)fluoroalkyl groups optionally containing one or more hydrogen or chlorine atoms;

W represents a $C_2$-$C_{50}$ chain comprising recurring units, equal to or different from each other, of formula —$(CR_1R_2$—$CR_3R_4)$—, wherein $R_1$, $R_2$, $R_3$ and $R_4$, equal to or different from each other, are independently selected from the group consisting of halogen atoms and $C_1$-$C_6$ (per)haloalkyl groups;

T is a functional group selected from the group consisting of carboxylic acid groups, acyl fluoride groups, amide groups, and ester groups;

z is 1 or 2;

m, q, r and s are integers >0, t and x are integers ≥0, and q is an integer >1.

12. A method for manufacturing a functional (per)fluoropolyether derivative comprising the step of reacting the poly(fluorosulfate) PFPE of claim 1 with a nucleophilic agent.

13. The method according to claim 12, wherein the nucleophilic agent is selected from the group consisting metal halogenides, alcoholates, and amines.

14. The method according to claim 12, wherein the functional (per)fluoropolyether derivative complies with formula (V) here below: $XO(CF_2O)_s(CF_2CF_2O)_m(CF_2CF(T)O)_q$—$(CF_2(CF_2)_zCF_2O)_r$—$(O)_t$—$(WO)_x$—X' (V), the recurring units being statistically distributed along the (per)fluoropolyoxyalkylene chain, wherein:

X and X', equal to or different from each other, are functional groups independently selected from the group consisting of -T and —$CF_2T$ and $C_1$-$C_2$ (per)fluoroalkyl groups optionally containing one or more hydrogen or chlorine atoms;

W represents a $C_2$-$C_{50}$ chain comprising recurring units, equal to or different from each other, of formula —$(CR_1R_2$—$CR_3R_4)$—, wherein $R_1$, $R_2$, $R_3$ and $R_4$, equal to or different from each other, are independently selected from the group consisting of halogen atoms and $C_1$-$C_6$ (per)haloalkyl groups;

T is a functional group selected from the group consisting of carboxylic acid groups, acyl fluoride groups, amide groups, and ester groups;

z is 1 or 2;

m, q, r and s are integers >0, t and x are integers ≥0, and q is an integer >1.

15. A method for manufacturing a functional (per)fluoropolyether derivative comprising the step of utilizing the poly(fluorosulfate) PFPE of claim 1, wherein said utilizing the poly(fluorosulfate) PFPE comprises the step of reacting the poly(fluorosulfate) PFPE with a nucleophilic agent.

16. The method according to claim 15, wherein the functional (per)fluoropolyether derivative complies with formula (V) here below: $XO(CF_2O)_s(CF_2CF_2O)_m(CF_2CF(T)O)_q$—$(CF_2(CF_2)_zCF_2O)_r$—$(O)_t$—$(WO)_x$—X' (V), the recurring units being statistically distributed along the (per)fluoropolyoxyalkylene chain, wherein:

X and X', equal to or different from each other, are functional groups independently selected from the group consisting of -T and —$CF_2T$ and $C_1$-$C_2$ (per)fluoroalkyl groups optionally containing one or more hydrogen or chlorine atoms;

W represents a $C_2$-$C_{50}$ chain comprising recurring units, equal to or different from each other, of formula —$(CR_1R_2$—$CR_3R_4)$—, wherein $R_1$, $R_2$, $R_3$ and $R_4$, equal to or different from each other, are independently selected from the group consisting of halogen atoms and $C_1$-$C_6$ (per)haloalkyl groups;

T is a functional group selected from the group consisting of carboxylic acid groups, acyl fluoride groups, amide groups, and ester groups;

z is 1 or 2;

m, q, r and s are integers >0, t and x are integers ≥0, and q is an integer >1.

* * * * *